United States Patent [19]

Jenkins, Jr.

[11] 4,299,446
[45] Nov. 10, 1981

[54] COMPOUND ANAMORPHIC MIRROR AND FRAME FOR OFF-AXIS REFLECTED IMAGE MODIFICATION

[75] Inventor: Harry H. Jenkins, Jr., Menlo Park, Calif.

[73] Assignee: Atari, Inc., Sunnyvale, Calif.

[21] Appl. No.: 91,629

[22] Filed: Nov. 5, 1979

[51] Int. Cl.³ .............................................. G02B 5/10
[52] U.S. Cl. .................................. 350/296; 350/320; 358/231
[58] Field of Search ............... 273/DIG. 28; 358/185, 358/242, 250, 254, 231; 353/98; 350/181, 293, 296, 320, 174

[56] References Cited

U.S. PATENT DOCUMENTS

| | | | |
|---|---|---|---|
| 972,373 | 10/1910 | Hebig | 350/181 |
| 1,872,905 | 8/1932 | Darling | |
| 1,974,820 | 9/1934 | Krell, Jr. | |
| 2,165,078 | 7/1939 | Toulon | 356/296 X |
| 2,285,509 | 6/1942 | Goshaw | 358/254 X |
| 3,142,223 | 7/1964 | Vetter | 350/293 X |
| 3,151,206 | 9/1964 | Daymon | |
| 3,697,154 | 10/1972 | Johnson | 350/174 |
| 3,834,051 | 9/1974 | Barnes, Jr. et al. | 272/8 M X |
| 4,029,399 | 6/1977 | Haile | 350/293 |
| 4,060,835 | 11/1977 | Gdovin | 358/254 X |
| 4,084,194 | 4/1978 | Hector | 273/DIG. 28 |

FOREIGN PATENT DOCUMENTS 526078  5/1955  Italy .................................... 350/296

Primary Examiner—F. L. Evans
Attorney, Agent, or Firm—Townsend and Townsend

[57] ABSTRACT

A system for constructing an anamorphic mirror which reflects an image from an off-axis source such as a CRT display is disclosed. A rectangular frame is provided which has rectilinear top, bottom and side portions defining an inwardly directed continuous groove. The groove is linear along the side portions of the frame, and curved concavely along the top and bottom portions of the frame. A flexible reflective element is provided which is flat and has a trapezoidal shape widest at the top in its unflexed configuration. The element is flexed into a curved shape and inserted into the groove in the frame so that it retains its flexed configuration. The reflective element thus provides a mirror in which the reflected image is expanded towards the sides and presents a one-dimensional infinity effect to simulate a wide field having a variable depth, while maintaining the borders of the field linear to provide the illusion of a rectangle laid back at the top.

11 Claims, 5 Drawing Figures

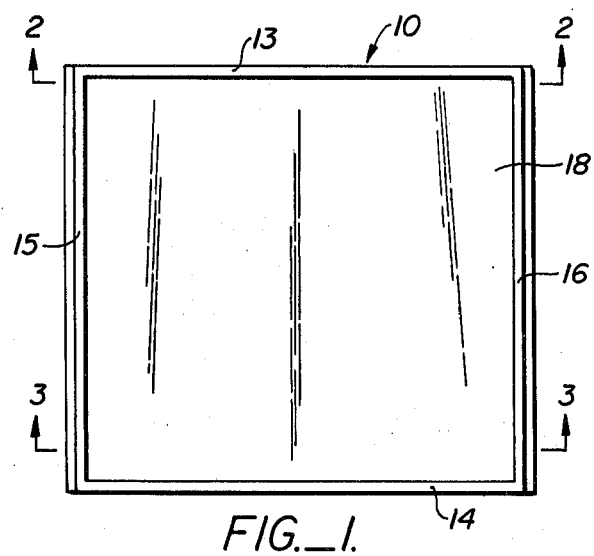
FIG._1.
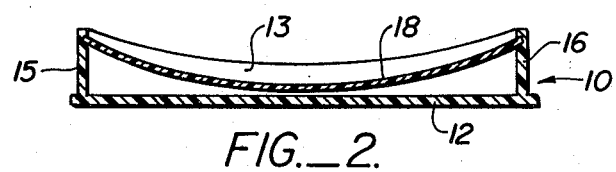
FIG._2.
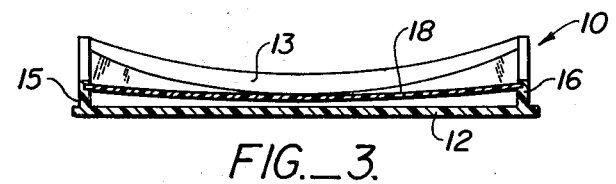
FIG._3.
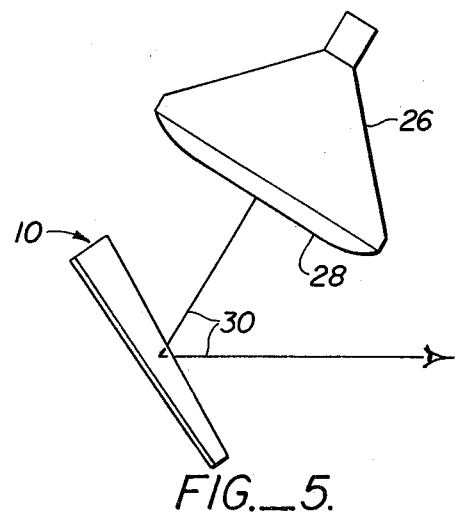
FIG._5.

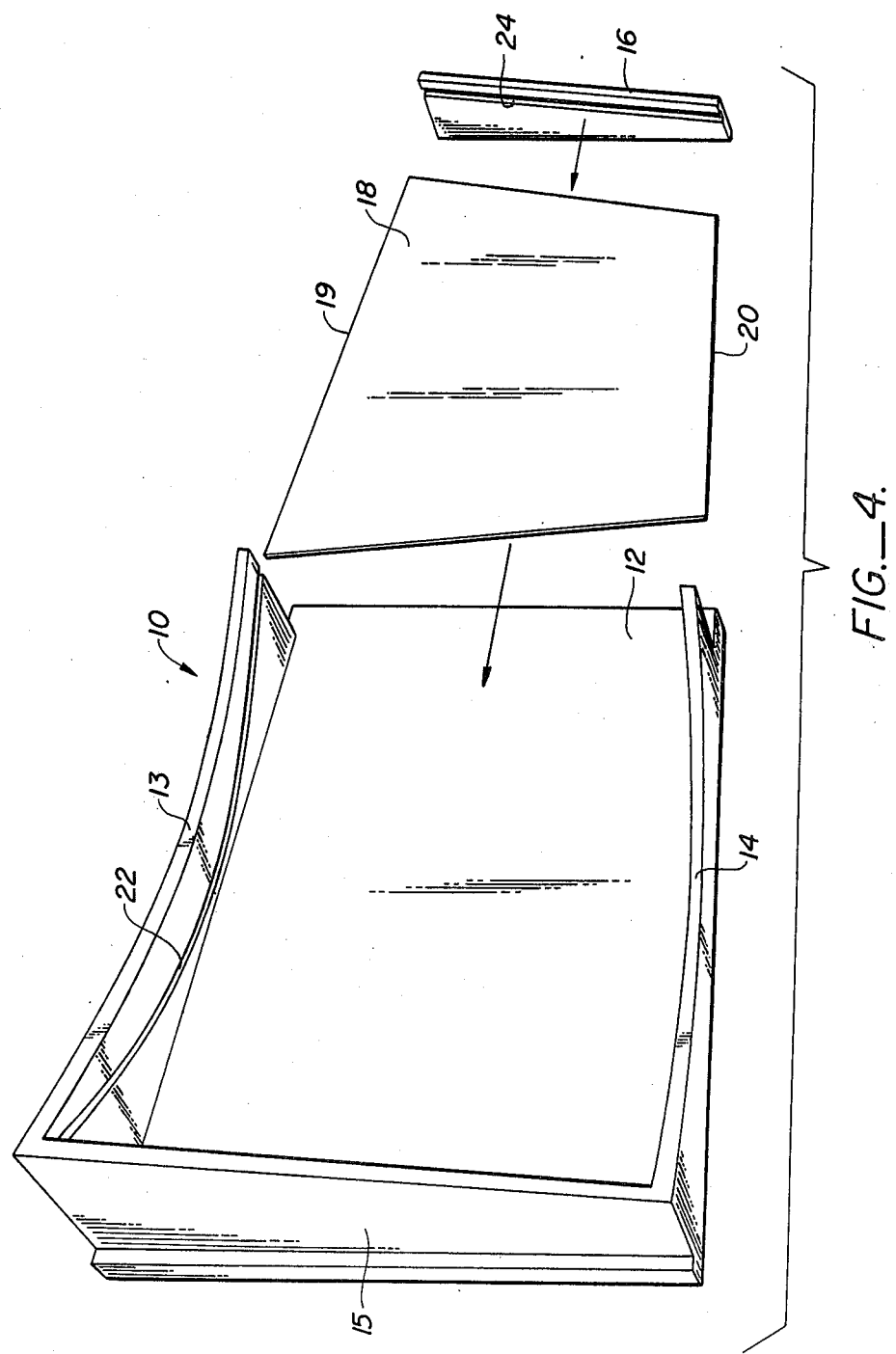
FIG._4.

COMPOUND ANAMORPHIC MIRROR AND FRAME FOR OFF-AXIS REFLECTED IMAGE MODIFICATION

BACKGROUND OF THE INVENTION

This invention relates to an anamorphic mirror which provides an effective and attractive reflected image from a CRT display viewed from off its optical axis.

In certain video games, primarily games which are coin operated and used in an arcade setting rather than in the home, the game is enclosed in a cabinet which contains a seating area for the player. A CRT display is often reflected by one or more mirrors to accommodate the geometric and other constraints of the cabinet and provide enhancement to the reflected image.

Certain such video games are contained in a cabinet in which the CRT display is located above the head of the player and points downwardly at an acute angle to horizontal. A mirror is located immediately in front of the face of the player, and is angled upwardly so that the player sees the CRT display. Because the CRT display must be pointed downwardly at an acute angle, and the player looks directly forward, the player views the image from off the optical axis of the CRT display.

In video games in which off-axis projection is used, the user typically views the CRT display through a flat mirror. Because the user is located quite close to the mirror, which is in turn located close to the CRT, the viewer sees an image which is substantially smaller than that presented by the CRT display. Since the CRT display itself is relatively small, shrinking the image still further substantially diminishes the quality of the viewed image. In addition, the flat mirror cannot add to the two-dimensional nature of the CRT display.

In relatively complex devices such as aircraft simulators, a spherical mirror is used to present the image to the viewer. However, to provide an acceptable image which is square and undistorted, the image must be projected on the spherical mirror and reflected back to the viewer along the optical axis of the image. As a result, an extra mirror, typically a half mirror which the viewer can see through, is used so that the projection can be along the optical axis. However, size and expense constraints often make it undesirable to incorporate such projection techniques in a video game.

SUMMARY OF THE INVENTION

The present invention provides a system for constructing an anamorphic mirror which reflects an image from an off-axis source such as a CRT display. A rectangular frame is provided which has rectilinear top, bottom and side portions defining an inwardly directed continuous groove. The groove is linear along the side portions of the frame, and curved concavely along the top and bottom portions of the frame. A flexible reflective element is provided which is flat and has a trapezoidal shape widest at the top in its unflexed configuration. The element is flexed into a curved shape and inserted into the groove in the frame so that it retains its flexed configuration. The reflective element thus provides a mirror in which the reflected image is expanded towards the sides and appears deeper toward the top to simulate a wide field having a variable depth.

The horizontal magnification provided by the present invention yields a "big screen" effect. A much larger virtual image is presented to the viewer, and compensation is achieved for virtual image diminution. The projected image is slightly keystoned toward the top for perspective. In addition, the mirror yields a one dimensional infinity effect which is more pronounced toward the top caused by the linear sides and the increased curvature of the reflective element toward the top.

The present invention provides a simple system for constructing an anamorphic mirror having the desired reflection characteristics. Only two elements, the frame and the reflective element, are required. The trapezoidal reflective element is flexed so that it is rectangular and inserted into the frame which maintains its flexed configuration. This simple construction is adequate to maintain the mirror in its complex compound configuration without additional support.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a front view of a preferred embodiment of the anamorphic mirror of the present invention;

FIG. 2 is a section view taken along lines 2—2 of FIG. 1;

FIG. 3 is a section view taken along lines 3—3 of FIG. 1;

FIG. 4 is an exploded view illustrating the manner in which the mirror of FIG. 1 is constructed;

FIG. 5 is a side schematic view of the incorporation of the mirror of FIG. 1 in a CRT projection system.

DESCRIPTION OF THE PREFERRED EMBODIMENT

The preferred embodiment of the anamorphic mirror 10 of the present invention is illustrated generally by way of reference to FIGS. 1-3. Mirror 10 includes a frame consisting of a back plate 12, top and bottom portions 13, 14 and side portions 15, 16. Frame portions 13-16 are arranged in a rectilinear fashion on back plate 12 so that the frame is square, as illustrated, or at least rectangular.

A flexible sheet 18 of acrylic mirror material provides the reflective element of mirror 10. As will be explained in more detail hereinafter, reflective element 18 is flexed and inserted into grooves in frame portions 13-16 so that it retains its flexed configuration.

Reflective element 18 is flexed so that it has a parabolic configuration in any plan section, as illustrated in FIGS. 2 and 3. Moreover, the focal length of the parabolic section of reflective element 18 is shorter at the top (FIG. 2) than it is at the bottom (FIG. 3) so that the reflective element 18 has a deeper curvature at the top than it has at the bottom. The focal length of the plan sections decreases gradually from the bottom to the top of reflective element 18.

The manner in which the preferred embodiment of the anamorphic mirror 10 of the present invention is constructed is illustrated by way of reference to FIG. 4. Reflective element 10 is cut so that it has a trapezoidal configuration when flat which is wider at its top edge 19 than its bottom edge 20. One side portion 16 of the frame is detachable from top and bottom portions 13, 14 and back plate 12.

A parabolic groove 22 is formed in the top portion 13 of the frame. The shape of groove 22 corresponds to the desired parabolic configuration of reflective element 18 along its top edge (see FIG. 2). A corresponding groove (not visible) in the shape of the desired curvature of the bottom edge 20 of reflective element 18 is formed in bottom portion 14. Groove 22 and the corresponding bottom groove define first and second parabolic curves with foci of different magnitudes. A connecting groove 24 is formed in side portion 16, and a corresponding connecting groove (not visible) is formed in side portion 15. The connecting grooves in side portions 15, 16 are linear.

Mirror 10 is assembled by sliding the top and bottom edges of reflective element 18 into the corresponding grooves in top and bottom frame portions 13, 14 respectively. Because of the greater curvature of the top edge of the reflective element than the bottom edge, the trapezoidal reflective element takes on a rectangular or square configuration when flexed and inserted into the frame. After reflective element 18 is completely inserted side portion 16 is attached to complete the frame. The frame retains reflective element 18 in its desired flexed configuration and additional supports are not needed.

The manner in which the mirror 10 of the present invention can be used in an application such as a video game is illustrated by way of reference to FIG. 5. A CRT display 26 having a curved imaging surface 28 provides the source image for the game. Typically, CRT 26 is located over the head of the viewer although other orientations are feasible. Mirror 10 is mounted at an angle so that in the image provided by CRT display 26 is reflected to a viewer, as depicted by arrow 30.

In the schematic depiction of FIG. 5, it is apparent that the viewer does not view the image of the CRT display 26 along its optical axis. However, the parabolic curvature of reflective element 18 in plan section and its linear borders serves to minimize eliminate distortion resulting from such off axis viewing and the curvature of imaging surface 28. The viewed image is perceived as nearly square or rectangular but is in reality slightly keystoned toward the top.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. Apparatus for providing an anamorphic mirror which reflects an image from an off-axis curved source such as a CRT display so that the reflected image is expanded toward the sides to simulate a wide field and presents a one dimensional infinity effect, said apparatus comprising:
 a frame having top and bottom portions defining first and second inwardly directed continuous grooves curved concavely along the top and bottom portions of the frame, respectively, said first and second grooves defining first and second conic sections with foci of different magnitudes; and
 a flexible reflective element which is flat and has a trapezoidal shape widest at the top in its unflexed configuration, said element being flexed into a curved shape and inserted into the grooves in the frame to provide a reflector having the desired reflection characteristics.

2. Apparatus as recited in claim 1 wherein said first and second conic sections are substantially parabolic and the flexed reflective element defines a substantially parabolic surface of variable focus between said first and second grooves.

3. Apparatus as recited in claim 2 wherein the magnitude of the focus of the parabolic surface of the reflective element decreases toward the top of the element.

4. The apparatus of claim 1 wherein said frame further includes flanking side portions defining linear grooves in registration with said first and second grooves.

5. Apparatus for providing an anamorphic mirror which reflects an image from an off-axis curved source such as a CRT display so that the reflected image is expanded toward the sides to simulate a wide field and has a one-dimensional infinity effect, said apparatus comprising:
 a rectangular frame having rectilinear top, bottom and side portions defining an inwardly directed continuous groove which is linear along the side portions of the frame and has a concave shape along the top and bottom portions of the frame defining first and second parabolic curves, the first parabolic curve defined by the groove in the top portion of the frame having a shorter focus than that of the second parabolic curve defined by the groove in the bottom portion; and
 a flexible reflective element which is flat and has a trapezoidal shape widest at the top in its unflexed configuration, said element being flexed into a curved shape having substantially parabolic plan sections which decrease in focal length toward the top of the element, said element being inserted into the groove in the frame to provide a reflector having the desired reflection characteristics.

6. Apparatus as recited in claim 1 or 5 wherein the reflective element comprises an acrylic material.

7. Apparatus as recited in claim 4 or 5 wherein one side portion of the frame is removably attachable to the top and bottom portions thereof to facilitate insertion and removal of the reflective element within the frame.

8. A method for constructing an anamorphic mirror which reflects an image from an off-axis curved source such as a CRT display so that the reflected image is expanded toward the sides to simulate a wide field and has a one-dimensional infinity effect, said method comprising the steps of:
 shaping a flexible reflective element so that said element has a trapezoidal shape in its flat configuration having side edges of equal length and a top edge wider than the bottom edge;
 concavely flexing the reflective element so that the side edges are parallel and the reflective element has a substantially paraboloidal surface; and
 sliding the flexed reflective element into a grooved frame which maintains the flexed configuration of the reflective element to provide a reflector having the desired reflection characteristics.

9. A method as recited in claim 8 wherein said sliding step includes sliding the flexed reflective element into a grooved frame having top and bottom portions and a connecting side portion which in combination define an inwardly directed groove, and additionally comprising the step of retaining the flexed reflective element within the grooved frame by attaching another side frame portion to the distal ends of the top and bottom portions of the frame.

10. A method as recited in claim 8 wherein said flexing step includes the step of bending the reflective element so that it is substantially parabolic in plan section, the focal length of the parabolic section decreasing toward the top of the reflective element.

11. A method as recited in claim 8 wherein the flexing and sliding steps are performed simultaneously.

* * * * *

UNITED STATES PATENT AND TRADEMARK OFFICE
CERTIFICATE OF CORRECTION

PATENT NO. : 4,299,446
DATED : November 10, 1981
INVENTOR(S) : Harry H. Jenkins, Jr., Menlo Park, CA.

It is certified that error appears in the above—identified patent and that said Letters Patent is hereby corrected as shown below:

Column 3, line 42 insert the word "or" between the words "minimize" and "eliminate".

Signed and Sealed this

Sixteenth Day of February 1982

[SEAL]

Attest:

GERALD J. MOSSINGHOFF

Attesting Officer

Commissioner of Patents and Trademarks